United States Patent
Ritchie et al.

(10) Patent No.: US 6,740,301 B1
(45) Date of Patent: May 25, 2004

(54) PROCESS FOR PRODUCING A LITHIUM TRANSITION METAL SULPHIDE

(75) Inventors: Andrew G Ritchie, Hampshire (GB); Peter G Bowles, Hampshire (GB)

(73) Assignee: QinetiQ Limited, Hants (GB)

( * ) Notice: Subject to any disclaimer, the term of this patent is extended or adjusted under 35 U.S.C. 154(b) by 0 days.

(21) Appl. No.: 09/980,711

(22) PCT Filed: Jun. 5, 2000

(86) PCT No.: PCT/GB00/02179

§ 371 (c)(1),
(2), (4) Date: Dec. 5, 2001

(87) PCT Pub. No.: WO00/78673

PCT Pub. Date: Dec. 28, 2000

(30) Foreign Application Priority Data

Jun. 17, 1999 (GB) .............................................. 9914041

(51) Int. Cl.$^7$ .............................................. C01B 17/00
(52) U.S. Cl. ........................................................ 423/511
(58) Field of Search ........................................ 423/511

(56) References Cited

U.S. PATENT DOCUMENTS

| | | | | |
|---|---|---|---|---|
| 3,925,098 A | * | 12/1975 | Saunders et al. ............ 429/103 |
| 4,164,069 A | * | 8/1979 | Tomczuk .................... 29/623.1 |
| 4,172,926 A | * | 10/1979 | Shimotake et al. ......... 429/112 |
| 4,731,307 A | | 3/1988 | Guidotti | |
| 4,761,487 A | * | 8/1988 | Godshall ..................... 429/112 |
| 4,917,871 A | * | 4/1990 | Dahn et al. .................... 423/61 |
| 5,677,081 A | * | 10/1997 | Iwamoto et al. ............. 429/319 |
| 6,207,327 B1 | * | 3/2001 | Takada et al. .............. 429/304 |
| 6,210,836 B1 | * | 4/2001 | Takada et al. ......... 429/231.95 |

FOREIGN PATENT DOCUMENTS

| | | |
|---|---|---|
| EP | 0 802 161 A1 | 10/1997 |
| FR | 2420852 A | 10/1979 |
| GB | 385895 | 7/1932 |
| GB | 453203 | 3/1935 |
| GB | 2017390 | 12/1958 |
| GB | 0805922 | 10/1979 |
| GB | 2 057 412 A | 4/1981 |

\* cited by examiner

*Primary Examiner*—Steven Bos
*Assistant Examiner*—William G. Wright, Sr.
(74) *Attorney, Agent, or Firm*—Nixon & Vanderhye P.C.

(57) ABSTRACT

A process for the production of a lithium transition metal sulphide such as lithium iron sulphide, the process comprising reacting a transition metal sulphide with lithium sulphide in a solvent comprising molten sulphur. Lithium transition metal sulphides obtained using this process are also claimed and are useful in the production of electrodes, in particular for rechargeable lithium batteries.

6 Claims, 1 Drawing Sheet

PROCESS FOR PRODUCING A LITHIUM TRANSITION METAL SULPHIDE

Figure 1:
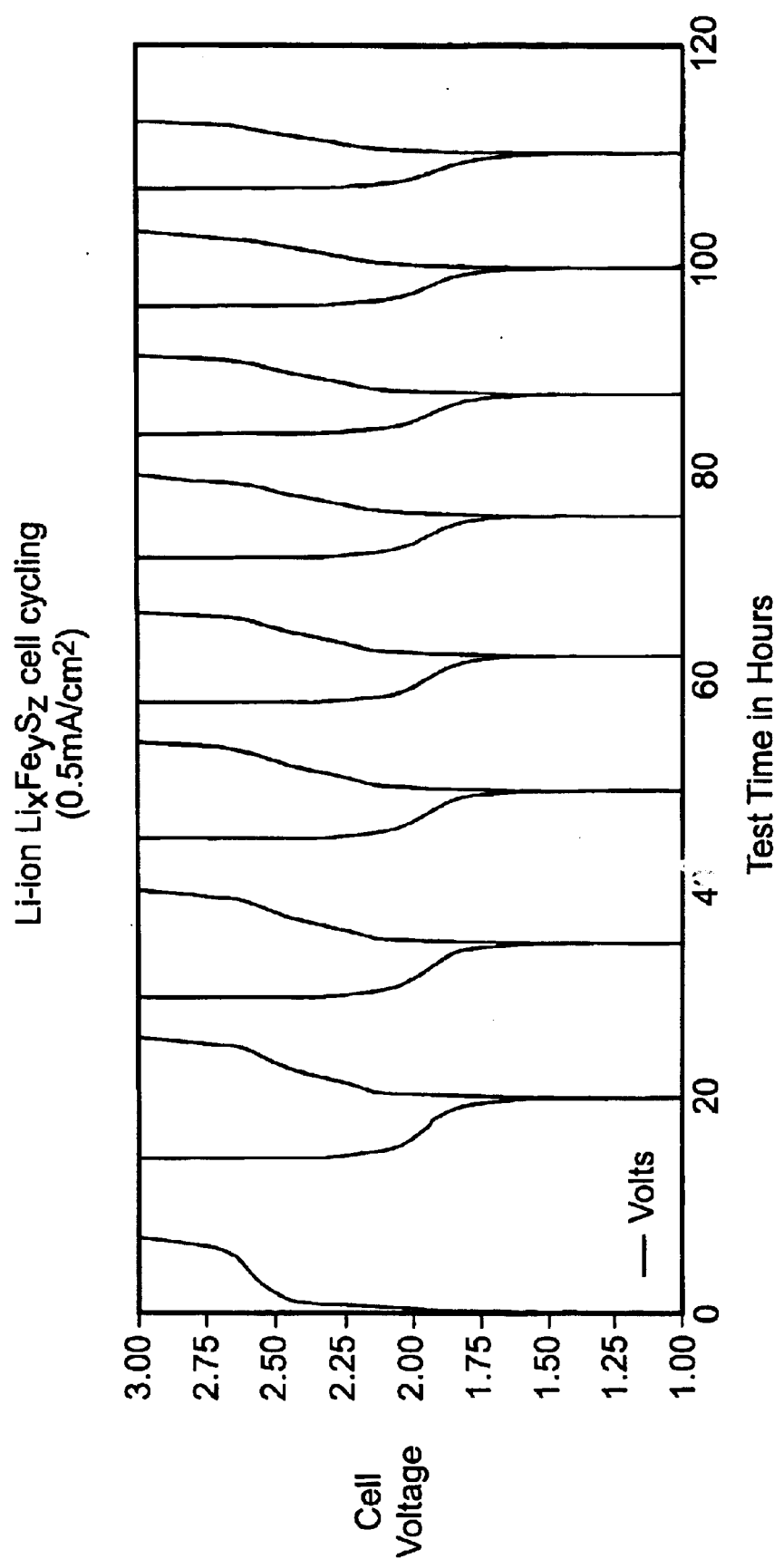

This application is the U.S. national phase of international application PCT/GB00/02179 filed Jun. 5, 2000, which designated the U.S.

The present invention relates to processes for the production of suiphides, in particular lithium transition metal sulphides useful in the production of batteries, and to the use of molten sulphur as a solvent in such processes.

In the 1980's, there was extensive research into lithium metal rechargeable batteries, particularly using sulphides, but also selenides, as cathode materials. Many lithium metal/molybdenum disulphide (Li/MoS$_2$) batteries were produced but these were withdrawn following an incident in which a fire was attributed to the malfunction of such a battery. Other sulphides, such as iron disulphide FeS$_2$, titanium disuiphide TiS$_2$ and selenides, such as niobium triselenide NbSe$_3$ have also been particularly investigated as alternative cathode materials Although the use of lithium metal rechargeable batteries is now limited for reasons of safety, they are still used in the laboratory testing of materials. Lithium metal primary batteries using iron disulphide cathodes are manufactured.

Virtually all modern lithium rechargeable batteries are of the lithium-ion type, in which the negative electrode (anode) comprises lithium absorbed into a carbon support. These use a lithium containing cathode material, which is usually lithium cobalt oxide LiCoO$_2$ although lithium nickel oxide LiNiO$_2$, lithium manganese oxide LiMn$_2$O$_4$ and mixed oxides are also known to have been used.

Due to their high cost, the use of lithium rechargeable batteries at present is mainly limited to premium applications, such as portable computers or telephones. To gain access to wider markets, for example in applications such as the powering of electric vehicles, the cost must be reduced. Hence there is a strong demand for the high performance obtainable from lithium-ion batteries at much more economical prices.

On first inspection, the use of sulphides as cathode materials is not as attractive as the use of oxides. This is because the voltage achievable from sulphides is generally only about half of that achievable using corresponding oxides. However, the capacity of batteries incorporating sulphide based cathodes, measured In ampere hours per gram of material, is about 3 times greater than corresponding batteries incorporating oxide based cathodes. This leads to an overall advantage of about 1.5 times in terms of cathode energy density for batteries with sulphide based cathodes. A further advantage is that iron sulphides, In particular ferrous sulphide (FeS), are inexpensive materials which may be dug out of the ground as natural occurring minerals. By contrast, lithium cobalt oxide is an expensive material, due mainly to the high cost of cobalt metal.

Binary transition metal sulphides are however not suitable for direct use in lithium-ion cells as they do not contain lithium. Lithium transition metal ternary sulphides, such as lithium molybdenum sulphide, lithium titanium sulphide, lithium niobium sulphide and lithium iron sulphide have been suggested as electrode materials for batteries (see for example, Japanese Kokai No 10208782 and Solid State Ionics 117 (1999) 273–276). The conventional synthesis of lithium iron sulphide is via a solid state reaction in which lithium sulphide, Li$_2$S, and ferrous sulphide, FeS, are Intimately mixed together and heated under an inert atmosphere at a temperature of ca. 800° C. The reaction is diffusion controlled and the kinetics are slow. Consequently, the reaction can take up to 1 month at temperature to reach completion. This is highly inconvenient and is costly in terms of energy input. The economics of this synthesis for battery production are clearly unfavourable.

On a laboratory scale, lithium iron sulphide can be made by an electrochemical synthesis route in which a lithium metal/iron disulphide cell is discharged, and the lithium metal is removed and replaced by a carbon anode. This process however, is not amenable to scaling up. A further laboratory synthesis of lithium iron sulphide is the solid state reaction of lithium nitride, Li$_3$N, with iron disulphide, FeS$_2$, but again, this method is unsuitable for large scale use because of the high cost and shock sensitivity of lithium nitride.

The applicants have developed an economical synthesis which can be operated on a large scale to produce sulphides, or mixtures of sulphides, which have useful electrochemical properties.

In accordance with the present invention a process for the production of a lithium transition metal sulphide comprises reaction a transition metal sulphide with lithium sulphide in a solvent comprising molten sulphur.

Suitably the transition metal sulphide used in the process is an iron, molybdenum, niobium or titanium sulphide and is preferably an iron sulphide. Ferrous sulphide, FeS is an inexpensive and readily available naturally occurring mineral.

Preferably the reaction is carried out at a temperature of between 95.5° C. and 444° C. This is sufficient to melt the sulphur in order to allow it to act as solvent.

The reaction proceeds more rapidly than previously known processes. On a laboratory scale, the reaction can be completed in a few hours, with the actual reaction time dependent largely on the heating time of the furnace.

Although lithium sulphide may be bought commercially, for large scale production it is more economical to produce lithium sulphide via the reduction of lithium sulphate. One convenient method is to heat lithium sulphate above its melting point of 860° C. in the presence of carbon. Other standard reduction methods may equally be used, as well known in the art.

The sulphur used as the solvent is inexpensive, but it is preferably recovered from the product and reused. This may be achieved by dissolving it out of the product using a solvent. A suitable solvent is carbon disulphide, which can also be recovered and recycled if desired. Alternatively, sulphur can be removed by vapourisation, for example by heating the product sulphur mixture above the boiling point of sulphur, which is 444° C. at atmospheric pressure. A temperature in the region of 500° C. is suitable.

Lithium transition metal sulphides obtained by the above described process form a further aspect of the invention. These may comprise a single lithium transition metal sulphide phase or a mixture of lithium transition metal sulphide phases and are useful in the production of electrodes for use in batteries. In particular, they are useful in the production of electrodes for rechargeable batteries. These electrodes form the cathode, and suitable anodes are lithium ion anodes as are known in the art. Suitable electrolytes are also well known and include mixtures of inorganic carbonates, for example ethylene carbonate, propylene carbonate, diethyl or dimethyl carbonates, ethyl methyl carbonate together with a lithium salt, usually lithium hexafluorophosphate, LiPF$_6$, or lithium trifluoromethane sulphonate ("triflates"), LiCF$_3$SO$_3$ or lithium tetrafluoroboate, LiBF$_4$.

Molten sulphur is not a conventional solvent in a chemical reaction, and therefor this forms a further aspect of the invention. As described above, it is particularly suitable for use as a solvent in chemical reactions used in the production of sulphides, such as lithium transition metal sulphides.

The invention will now be particularly described by way of example only with reference to the accompanying diagrammatic drawing.

FIG. 1. which shows the charge/discharge (cycling) curve of a battery containing a cathode prepared using the material obtained by the process of the invention.

EXAMPLE

Synthesis of Lithium Iron Sulphide

Equimolar amounts of lithium sulphide, $Li_2S$, and ferrous sulphide, FeS, were intimately mixed with an excess of sulphur. This mixture was put into a tube furnace and heated to a temperature of 150° C. under an Inert atmosphere of argon. The furnace was held at this temperature for about an hour after which time the temperature was Increased to 500° C. in order to remove the excess sulphur by vapourisation. After cooling, the product was removed from the furnace and stored in an inert atmosphere glove box, to avoid reaction with moisture in air.

The product was analysed using X-ray powder diffraction which showed that the main phases present were lithium iron suiphides of various compositions, $Li_3Fe_2S_4$, $Li_7Fe_2S_6$ and $Li_2FeS_2$, with a small amount of iron disulphide (pyrites). $FeS_2$. This material was then tested for use in laboratory cells as described previously In A. Gilmour, C. O. Giwa, J. C. Lee and A. G. Ritchie, Lithium Rechargeable Envelope Cells, Journal of Power Sources, volume 65, pp 219–224 (1997), Power Sources 16. The lithium iron sulphide was made into a battery cathode by preparing a slurry of it with a binder, ethylene propylene-diene monomer (EPDM) dissolved in cyclohexane together with a conductive additive of carbon. This slurry was then coated onto a support using a doctor blade coating technique to form a cathode.

The cathode was electrically cycled against an anode of graphite using an electrolyte of ethylene carbonate/diethylcarbonate/lithium hexafluorophosphate, $LiPF_6$. Charge/discharge (cycling) curves are illustrated in FIG. 1. This shows that the product could be charged and discharged using standard conditions.

What is claimed is:

1. A process for producing a lithium transition metal sulphide, the process comprising reacting a transition metal sulphide with lithium sulphide in a solvent comprising molten sulphur.

2. A process according to claim 1, wherein the transition metal sulphide is an iron, molybdenum or titanium sulphide.

3. A process according to claim 2, wherein the transition metal sulphide is an iron sulphide.

4. A process for producing a lithium transition metal sulphide, the process comprising:

(a) reacting a transition metal sulphide with lithium sulphide in a solvent comprising molten sulphur, and (b) recovering sulphur from the product.

5. A process according to claim 4, wherein the sulphur is recovered by dissolution in a solvent.

6. A process according to claim 4, wherein the sulphur is recovered by vapourisation.

* * * * *